(12) United States Patent
Sprenger

(10) Patent No.: US 10,596,924 B2
(45) Date of Patent: Mar. 24, 2020

(54) RAIL SYSTEM FOR A VEHICLE SEAT

(71) Applicant: ADIENT LUXEMBOURG HOLDING S.À R.L., Luxembourg (LU)

(72) Inventor: Erik Sprenger, Wermelskirchen (DE)

(73) Assignee: Adient Luxembourg Holding S.à r.l., Luxembourg (LU)

( * ) Notice: Subject to any disclaimer, the term of this patent is extended or adjusted under 35 U.S.C. 154(b) by 0 days.

(21) Appl. No.: 16/323,958

(22) PCT Filed: Aug. 7, 2017

(86) PCT No.: PCT/EP2017/069957
§ 371 (c)(1),
(2) Date: Feb. 7, 2019

(87) PCT Pub. No.: WO2018/029149
PCT Pub. Date: Feb. 15, 2018

(65) Prior Publication Data
US 2019/0168639 A1 Jun. 6, 2019

(30) Foreign Application Priority Data

Aug. 8, 2016 (DE) .................. 10 2016 214 669
Sep. 20, 2016 (DE) .................. 10 2016 217 945

(51) Int. Cl.
*F16M 13/00* (2006.01)
*B60N 2/07* (2006.01)
(Continued)

(52) U.S. Cl.
CPC .......... *B60N 2/0705* (2013.01); *B60N 2/075* (2013.01); *B60N 2/0715* (2013.01);
(Continued)

(58) Field of Classification Search
CPC .. B60N 2/0705; B60N 2/0715; B60N 2/0727; B60N 2/075
(Continued)

(56) References Cited

U.S. PATENT DOCUMENTS

2008/0129169 A1* 6/2008 Daino .................... A47B 88/49
312/334.1
2017/0232870 A1* 8/2017 Quast ................... B60N 2/0705
297/344.1
(Continued)

FOREIGN PATENT DOCUMENTS

DE 25 49 711 A1 5/1977
EP 0 685 358 A1 12/1995
(Continued)

*Primary Examiner* — Todd M Epps
(74) *Attorney, Agent, or Firm* — Marshall & Melhorn, LLC

(57) ABSTRACT

A rail system (1), for a vehicle seat, includes a lower rail (3), an upper rail (5), a sliding block (7) and at least one rolling body cage (9) having rolling bodies (11). The sliding block (7) is rigidly connected to the lower rail (3). The rolling body cage (9) is movable relative to the sliding block (7), parallel to a longitudinal axis (13) of the lower rail (3), between two end positions defined by end stops (71) of the sliding block (7). The rolling body cage (9) is coupled to the lower rail (3) via the rolling bodies (11). The upper rail (5) is mounted movably on the sliding block (7) along the longitudinal axis (13) of the lower rail (3) and is coupled to the rolling body cage (9).

11 Claims, 5 Drawing Sheets

(51) Int. Cl.
*B60N 2/075* (2006.01)
*B60N 2/08* (2006.01)

(52) U.S. Cl.
CPC ......... *B60N 2/0727* (2013.01); *B60N 2/0825* (2013.01); *B60N 2205/20* (2013.01)

(58) Field of Classification Search
USPC ........... 248/429, 424, 430; 296/65.01, 65.11, 296/65.13, 65.15; 297/344.1
See application file for complete search history.

(56) References Cited

U.S. PATENT DOCUMENTS

| | | | |
|---|---|---|---|
| 2018/0229626 A1* | 8/2018 | Sprenger | B60N 2/0818 |
| 2019/0001842 A1* | 1/2019 | Quast | B60N 2/0722 |
| 2019/0176659 A1* | 6/2019 | Sprenger | B60N 2/0818 |
| 2019/0184859 A1* | 6/2019 | Flick | B60N 2/0705 |

FOREIGN PATENT DOCUMENTS

| | | |
|---|---|---|
| EP | 0 834 419 A1 | 4/1998 |
| EP | 2 614 985 A1 | 7/2013 |

\* cited by examiner

RAIL SYSTEM FOR A VEHICLE SEAT

CROSS REFERENCE TO RELATED APPLICATIONS

This application is a United States National Phase Application of International Application PCT/EP2017/069957 filed Aug. 7, 2017, and claims the benefit of priority under 35 U.S.C. § 119 of German Applications 10 2016 214 669.6, filed Aug. 8, 2016 and 10 2016 217 945.4, filed Sep. 20, 2016, the entire contents of which are incorporated herein by reference.

TECHNICAL FIELD

The relates to a rail system for a vehicle seat.

TECHNICAL BACKGROUND

A rail system of a vehicle seat generally comprises a lower rail fixed to the vehicle and an upper rail fixedly connected to the vehicle seat. The upper rail is longitudinally adjustable relative to the lower rail and lockable in longitudinal positions in order to permit longitudinal adjustments of the vehicle seat.

EP 0 834 419 A1 discloses a seat rail arrangement for the slidable adjustment of a seat, in particular of a motor vehicle seat. The seat rail arrangement comprises a lower rail, a displaceable upper rail and a sliding element which is arranged between a contact surface of the lower rail and a lower face of a supporting wall of the upper rail.

SUMMARY

It is an object of the present invention to provide an improved rail system for a vehicle seat and a sliding block for a rail system.

A rail system according to the invention for a vehicle seat comprises a lower rail, an upper rail, a sliding block and at least one rolling body cage having rolling bodies. The sliding block is rigidly connected to the lower rail and has end stops for the rolling body cage. The rolling body cage is movable relative to the sliding block parallel to a longitudinal axis of the lower rail between two end positions defined by the end stops and is coupled to the lower rail via the rolling bodies. The upper rail is mounted movably on the sliding block along the longitudinal axis of the lower rail and is coupled to the rolling body cage.

In the rail system according to the invention, the upper rail is coupled to the lower rail by the sliding block and the rolling body cage having the rolling bodies. The sliding block in this case acts as a plain bearing which advantageously may be subjected to high loads without being impaired by brinelling which may arise, for example, in the case of high loads on rolling bearings.

A sliding block according to the invention is configured as a separate and variably adjustable component for the rail system. The sliding block is, in particular, an H-shaped profiled component which comprises at least one fixing element and at least one end stop.

Moreover, the sliding block comprises two sliding block beams parallel to one another for the movable mounting of the upper rail and at least one sliding block crossmember connecting the two sliding block beams to each other in the manner of a ladder. The mounting of the upper rail on the sliding block beams advantageously reduces the friction of the upper rail with the sliding block, relative to the mounting of the upper rail on the sliding block over a large surface area. The end stops for a rolling body cage in this case respectively protrude outwardly from a sliding block beam, i.e. on a side of the sliding block beam remote from the sliding block crossmember, so that the positions of the end stops and the sliding block crossmember may be advantageously provided independently of one another.

By means of the fixing element the sliding block is advantageously positionable and fixable in a variable manner in one of the rails. For example, at least one sliding block crossmember comprises a fixing lug protruding from its lower face for fixing the position of the sliding block to a lower rail of the rail system.

By means of the end stops, the separate sliding block defines the end positions of the rolling body cage so that the lower rail does not need to have any end stops for the rolling body cage. As a result, additional operating steps and shaped portions on the lower rail are advantageously dispensed with. Moreover, visible paintwork defects on the lower rail which typically occur on the lower rail when the lower rail has an end stop in the field of vision, in particular when the end stop is produced after assembly, are eliminated.

One embodiment of the rail system provides that the rail system comprises two rolling body cages having rolling bodies, which are arranged on opposing sides of the sliding block, which in each case are movable relative to the sliding block parallel to the longitudinal axis of the lower rail between two end positions defined by end stops of the sliding block and which are coupled to the upper rail and via the rolling bodies to the lower rail. Two rolling body cages which are arranged on opposing sides of the sliding block advantageously permit a more stable coupling of the upper rail to the lower rail via the rolling body cages than just one rolling body cage.

A further embodiment of the rail system provides that each rolling body cage comprises a contact portion which faces the sliding block, which is angled relative to the longitudinal axis of the lower rail, wherein the contact portion extends between two end stops of the sliding block and, in the two end positions of the rolling body cage, in each case comes into contact with one of the end stops. The shape of the contact portion angled relative to the longitudinal axis of the lower rail permits an arrangement of the rolling body cage on one side of the sliding block such that the rolling body cage does not impede the mounting of the upper rail on the sliding block and/or facilitates this mounting.

A further embodiment of the rail system provides that at least one end stop, a contact portion coming into contact therewith in an end position of the rolling body cage, is arranged at one end of the sliding block and comprises a ramp-like stop end which has a surface on the upper face which drops toward the end of the sliding block, and that the contact portion is produced from a resiliently deformable material such that, when sliding from the end of the sliding block over the ramp-like stop end, the contact portion is bent inwardly in a resilient manner and, after passing the end stop, the contact portion adopts its original shape again. This embodiment of the rail system advantageously facilitates the assembly of the rail system by permitting, after fastening the sliding block to the lower rail, the insertion of the rolling body cage together with the upper rail from one end of the sliding block into the lower rail with the sliding block fastened thereto.

A further embodiment of the rail system provides that the lower rail comprises a lower rail bottom portion and for each rolling body cage a lower rail flank angled relative to the lower rail bottom portion, and a lower rail end portion angled inwardly and downwardly from the lower rail flank, and that the rolling body cage extends into the spatial region between the lower rail flank and the lower rail end portion and the rolling bodies of the rolling body cage bear against the region of the lower rail end portion which is angled inwardly. According to this embodiment of the rail system, a lower rail flank and a lower rail end portion of the lower rail advantageously form a pocket for a rolling body cage which defines and stabilizes the position of the rolling body cage and at the same time provides a bearing surface for the rolling bodies of the rolling body cage.

Exemplary embodiments of the invention are described in more detail with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
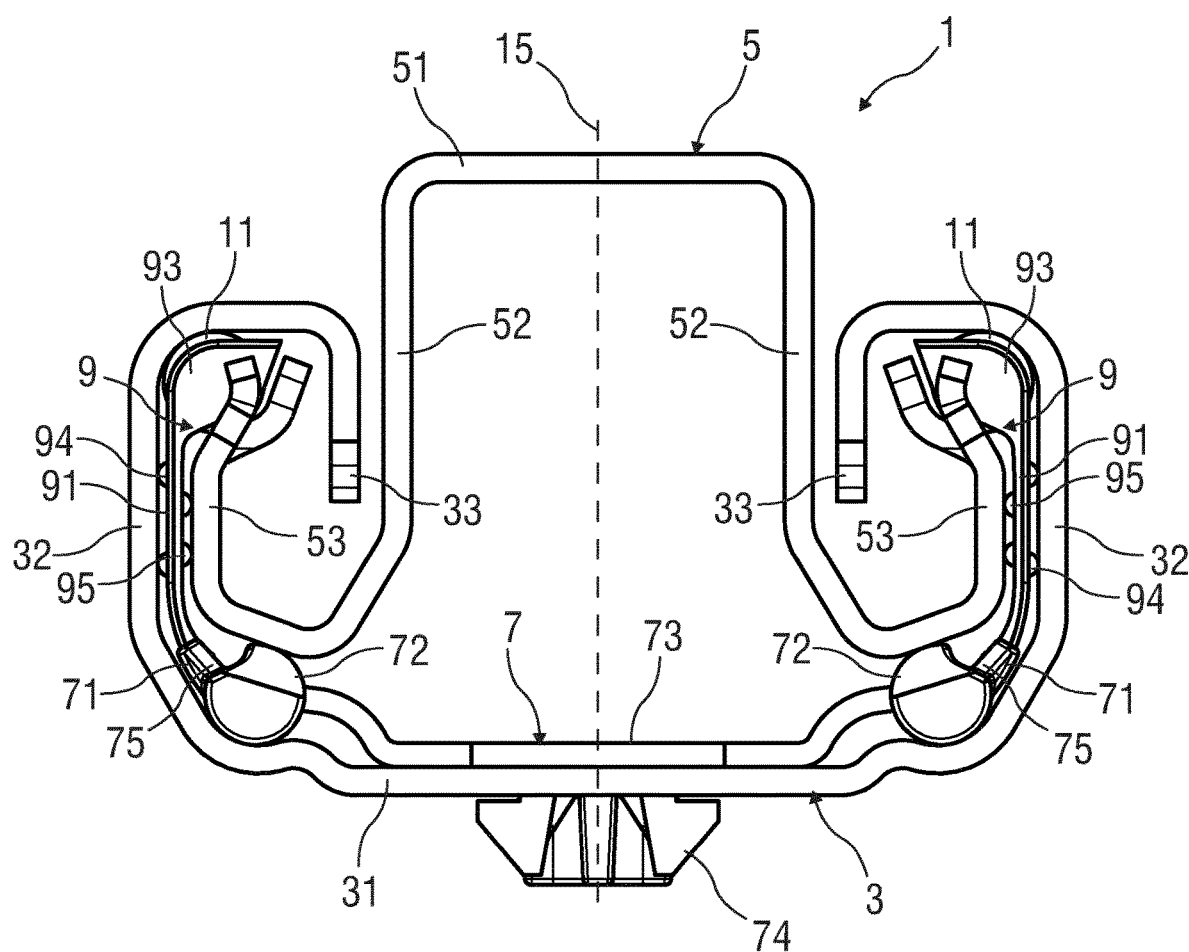
FIG. 1 is a sectional view of a rail system for a vehicle seat.

Referring to the drawings, parts which correspond to one another are provided in all of the Figures with the same reference numerals.

FIG. 1 shows a sectional view of a rail system 1 for a vehicle seat of a vehicle.

The rail system 1 comprises a lower rail 3, an upper rail 5, a sliding block 7 and two rolling body cages 9 with in each case a plurality of rolling bodies 11 which are designed, for example, as balls or rolls.

The sliding block 7 is configured as a separate component. The sliding block 7 is rigidly connected to the lower rail 3 and has end stops 71 for each rolling body cage 9.

Each rolling body cage 9 is movable relative to the sliding block 7 along a longitudinal axis 13 of the lower rail 3 between two end positions defined by the end stops 71 and coupled to the lower rail 3 via the rolling bodies 11.

The upper rail 5 is movably mounted on the sliding block 7 along the longitudinal axis 13 of the lower rail 3 and coupled to the rolling body cage 9.

The rail system 1 is designed to be approximately plane-symmetrical with a plane of symmetry 15 which contains the longitudinal axis 13 and which is perpendicular to the drawing plane of FIG. 1.

The lower rail 3 is rigidly connected to the vehicle or to a floor of a passenger compartment of the vehicle comprising the vehicle seat. The upper rail 5 is rigidly connected to the vehicle seat.

Figure 2:
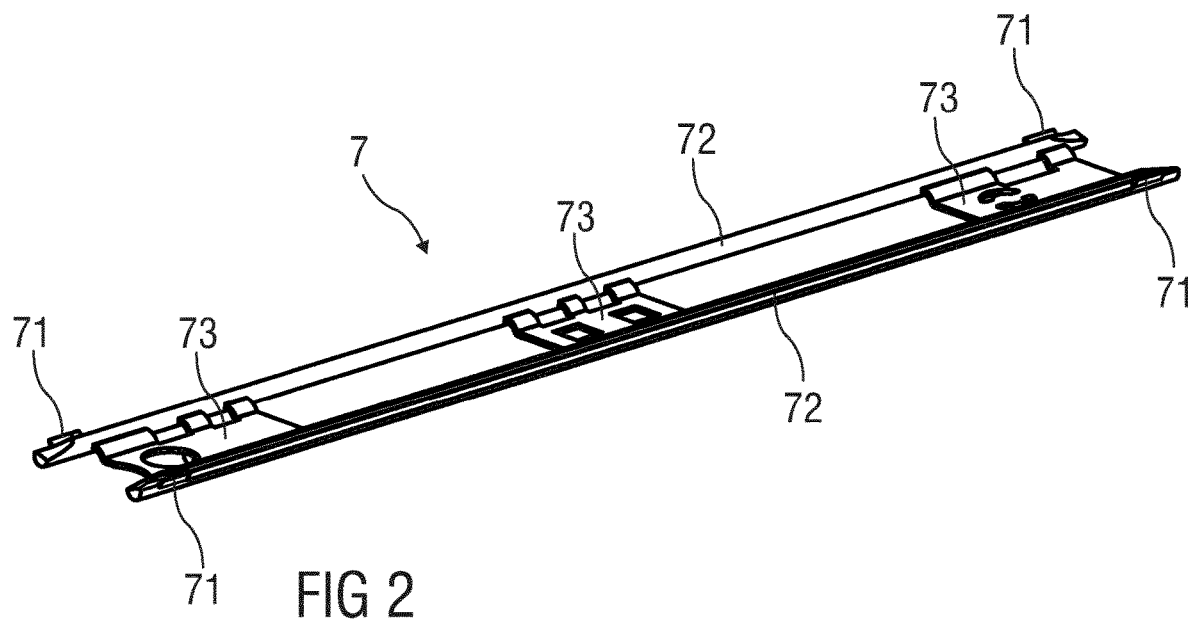
FIG. 2 is a perspective view of a sliding block.

FIG. 2 shows a perspective view of the sliding block 7.

Figure 3:
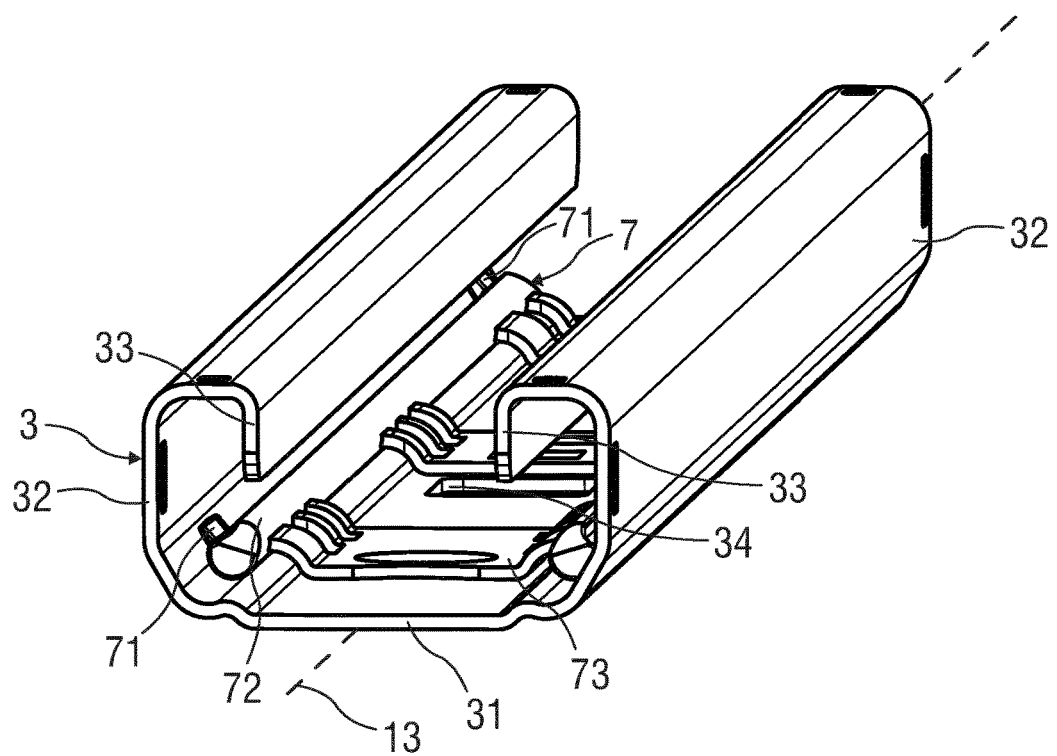
FIG. 3 is a perspective view of a lower rail and a sliding block fastened to the lower rail.

FIG. 3 shows a perspective view of the lower rail 3 and of the sliding block 7 fastened to the lower rail 3.

Figure 4:
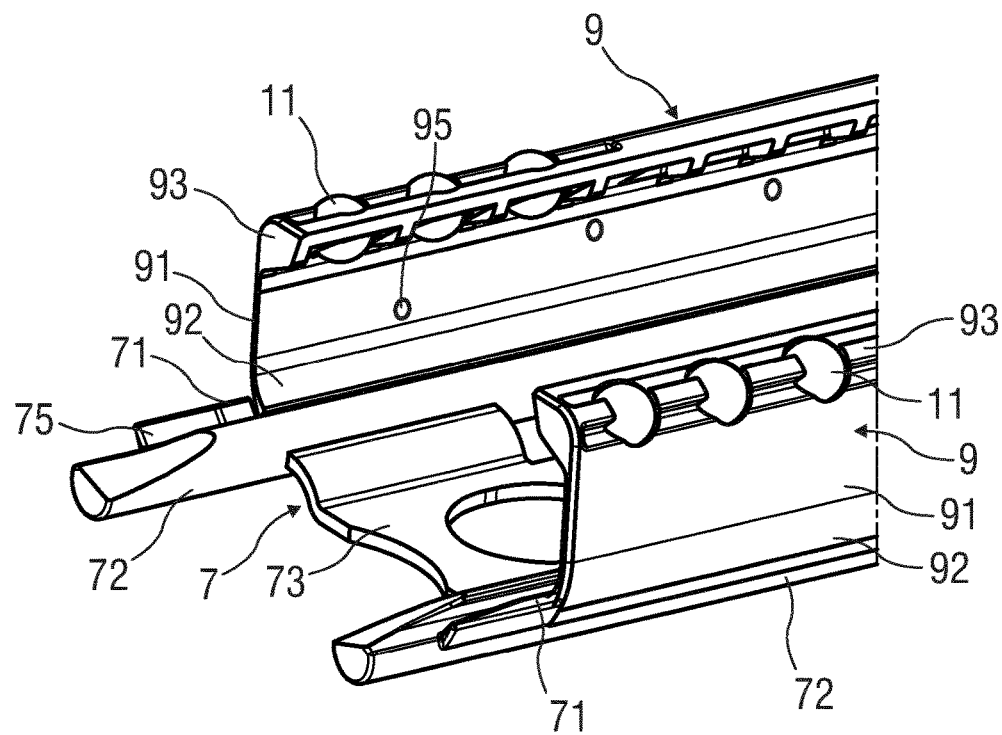
FIG. 4 is a perspective view of a sliding block and two rolling body cages having rolling bodies.

FIG. 4 shows a perspective view of the sliding block 7 and the rolling body cages 9 having the rolling bodies 11 in an end position of the rolling body cage 9.

The lower rail 3 has a lower rail bottom portion 31 and on each side of the plane of symmetry 15 a lower rail flank 32 angled relative to the lower rail bottom portion 31 and a lower rail end portion 33 angled from the lower rail flank 32 inwardly, i.e. toward the plane of symmetry 15 and downwardly, i.e. toward the lower rail bottom portion 31.

The upper rail 5 has an upper rail central portion 51 and on each side of the plane of symmetry 15 an upper rail flank 52 angled relative to the upper rail central portion 51 and an upper rail end portion 53 angled from the upper rail flank 52 outwardly, i.e. away from the plane of symmetry 15, and upwardly, i.e. away from the lower rail bottom portion 31. The upper rail central portion 51 extends above the lower rail 3 parallel to the lower rail bottom portion 31. Each upper rail flank 52 has a region extending between the lower rail end portions 33. Each upper rail end portion 53 protrudes in a spatial region which is located between a lower rail flank 32 and the lower rail end portion 33 angled relative thereto.

The upper rail 5 and the lower rail 3, for example, are in each case produced from a metal material.

The sliding block 7 is designed in the manner of a ladder with two sliding block beams 72 parallel to one another and sliding block crossmembers 73 connecting the two sliding block beams 72 to each other.

Each sliding block beam 72 has two end stops 71 which protrude outwardly therefrom and which are arranged on opposing end regions of the sliding block beam 72. The sliding block beams 72 extend parallel to the longitudinal axis 13 of the lower rail 3. The sliding block beams 72 support the upper rail 5, wherein a lower region of each upper rail end portion 53 bears against a sliding block beam 72.

The sliding block crossmembers 73 bear against a surface of the lower rail bottom portion 31 facing the upper rail 5. The sliding block crossmembers 73 have fixing lugs 74 which protrude from their lower faces and which engage in bottom recesses 34 corresponding thereto in the lower rail bottom portion 31 and as a result fix the position of the sliding block 7 in the lower rail 3.

The sliding block 7 is produced, for example, from a plastics material.

The rolling body cages 9 are arranged on different sides of the plane of symmetry 15. Each rolling body cage 9 is arranged in a spatial region between a sliding block beam 72, a lower rail flank 32 and an upper rail end portion 53. In this case a cage central portion 91 of the rolling body cage 9 extends between the lower rail flank 32 and the upper rail end portion 53.

A contact portion 92 of the rolling body cage 9 facing the sliding block beam 72 adjoins the cage central portion 91 in the downward direction. The contact portion 92 is angled inwardly toward the longitudinal axis 13 of the lower rail 3 from the cage central portion 91, said contact portion extending between the end stops 71 of the sliding block beam 72 and in the two end positions of the rolling body 11 in each case coming into contact with one of the end stops 71 (see FIG. 4).

A carrier portion 93 of the rolling body cage 9 carrying the rolling bodies 11 adjoins the cage central portion 91 in the upward direction. The surfaces of the rolling bodies 11 protrude upwardly from the carrier portion 93 and bear against the region of the lower rail end portion 33 of the lower rail 3 angled inwardly from the lower rail flank 32.

The cage central portion 91 of the rolling body cage 9 has first spacer lugs 94 on the lower rail flank side and second spacer lugs 95 on the upper rail end portion side which prevent the cage central portion 91 bearing flat against the lower rail flank 32 and the upper rail end portion 53.

The upper rail 5 is, for example, rigidly connected to the rolling body cages 9. Alternatively, the upper rail 5 is also movably mounted relative to the rolling body cages 9 by bearing at the bottom against the rolling bodies 11.

For the assembly of the rail system 1, initially the sliding block 7 is fastened in the lower rail 3. Subsequently, the upper rail 5 and the rolling body cages 9 are pushed at the same time into the lower rail 3 with the sliding block 7 fastened thereto. In order to permit this assembly, at least the end stops 71 at one end of the sliding block 7 in each case have a ramp-like stop end 75 which has a surface on the upper face which drops toward this end of the sliding block 7, i.e. a surface on the upper face, the surface normal thereof having a component oriented toward this end.

Moreover, each rolling body cage 9 is produced from a resiliently deformable material, at least in the region of its contact portion 92, so that when sliding over the ramp-like stop end 75 the contact portion 92 is bent inwardly in a resilient manner and after passing the end stop 71 adopts it original shape again and is arranged between the end stops 71 of the respective sliding block beam 72.

Figure 5:
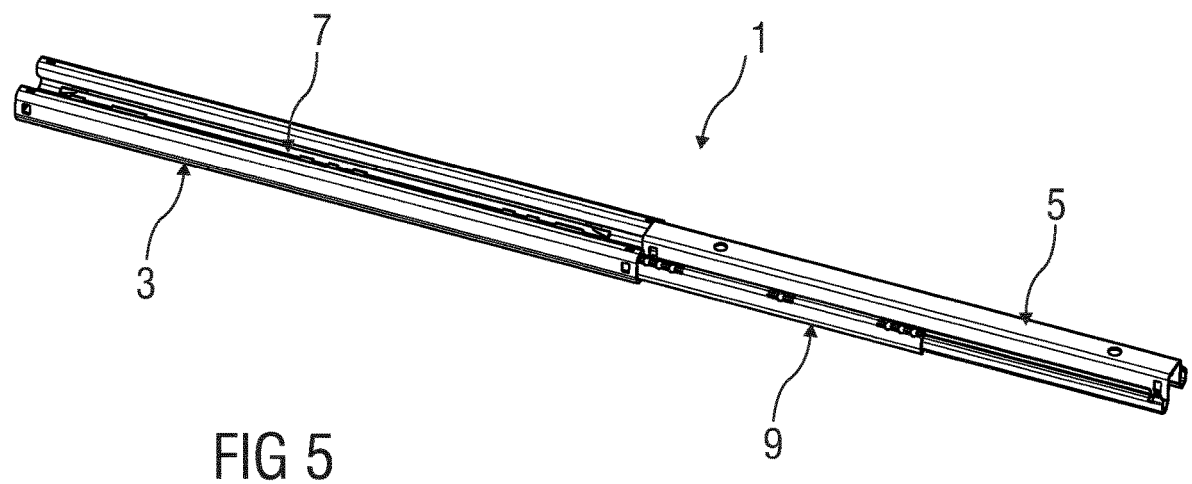
FIG. 5 is a first perspective view of a rail system for a vehicle seat in an assembled position of an upper rail and two rolling body cages having rolling bodies.
Figure 6:
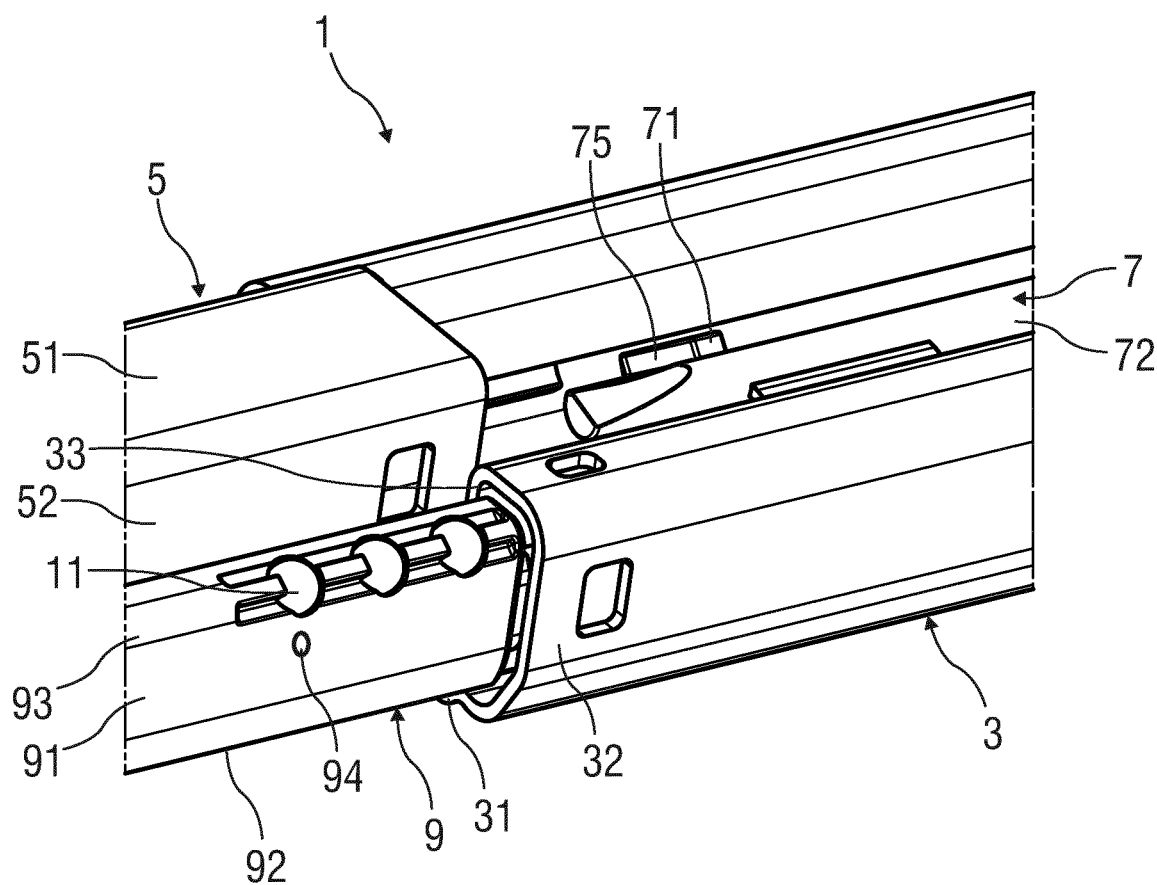
FIG. 6 is a second perspective view of a rail system for a vehicle seat in an assembled position of an upper rail and two rolling body cages having rolling bodies.
Figure 7:
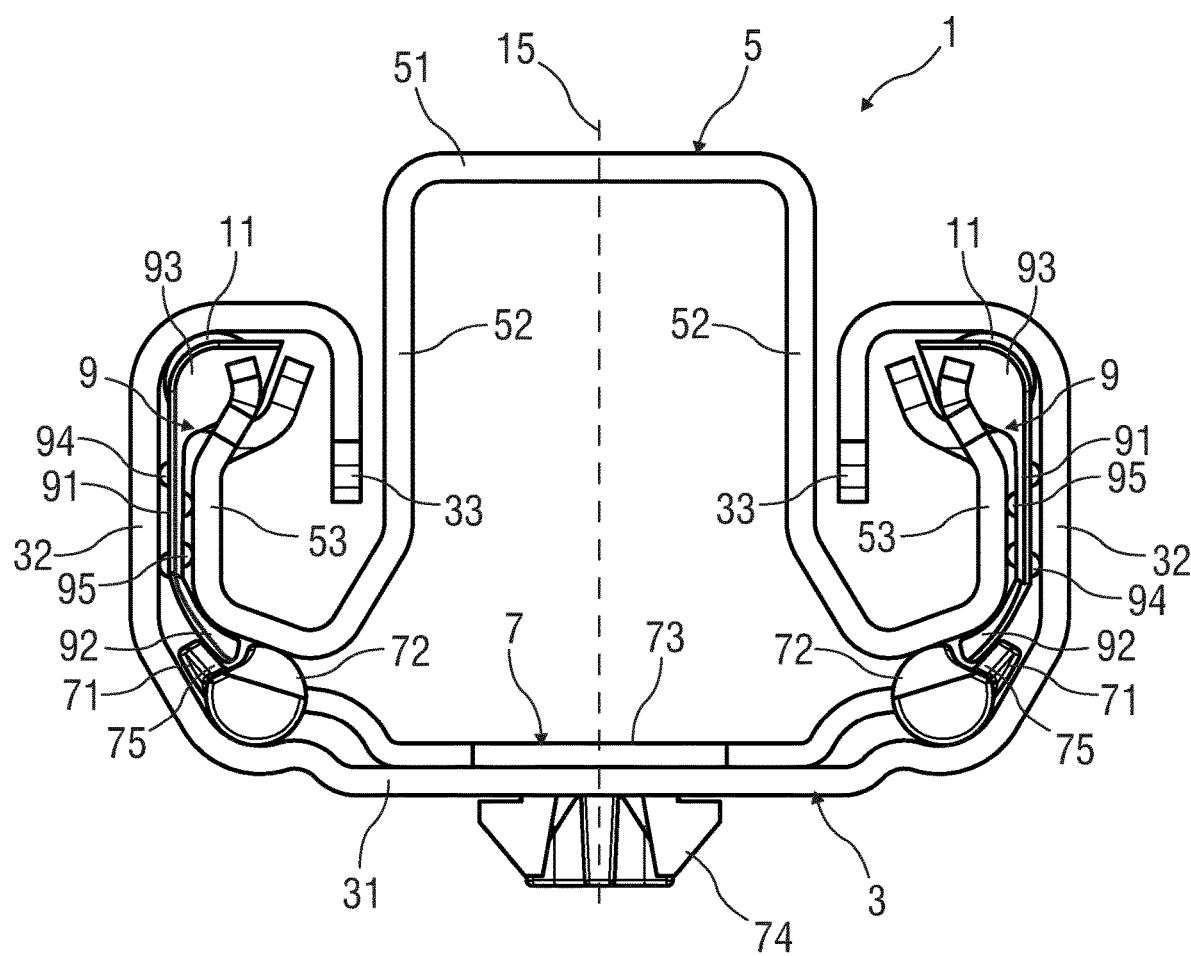
FIG. 7 is a sectional view of a rail system for a vehicle seat during the assembly of an upper rail and two rolling body cages having rolling bodies.

FIGS. 5 to 7 illustrate the described assembly of the rail system 1. FIGS. 5 and 6 show perspective views of the rail system 1 in an assembled position of the upper rail 5 and the rolling body cages 9 having the rolling bodies 11 before and/or at the start of the insertion of the upper rail 5 and the rolling body cages 9 into the lower rail 3 with the sliding block 7 fastened thereto. FIG. 7 shows a sectional view of the rail system 1 during the assembly of the upper rail 5 and the rolling body cages 9 having the rolling bodies 11, wherein the contact portions 92 of the rolling body cages 9 slide over the ramp-like stop ends 75 of the end stops 71 and are bent inwardly thereby.

While specific embodiments of the invention have been shown and described in detail to illustrate the application of the principles of the invention, it will be understood that the invention may be embodied otherwise without departing from such principles.

The invention claimed is:

1. A sliding block for a rail system for a vehicle seat, the rail system comprising a lower rail, an upper rail which is movable along a longitudinal axis of the lower rail and at least one rolling body cage which is coupled to the upper rail and via rolling bodies to the lower rail, the sliding block comprising:
   two sliding block beams parallel to one another, the upper rail being movably mounted thereon;
   at least one sliding block crossmember that connects the two sliding block beams to each with a ladder configuration; and
   end stops for the at least one rolling body cage, wherein each end stop for a rolling body cage protrudes outwardly from one of the sliding block beams.

2. The sliding block as claimed in claim 1, wherein at least one sliding block crossmember comprises a fixing lug that protrudes from fixing lug lower face for fixing a position of the sliding block to the lower rail of the rail system.

3. The sliding block as claimed in claim 2, wherein the sliding block is produced from a plastic material.

4. The sliding block as claimed in claim 1, wherein the sliding block is produced from a plastic material.

5. A rail system for a vehicle seat, the rail system comprising:
   a lower rail;
   an upper rail;
   at least one rolling body cage having rolling bodies; and
   a sliding block comprising two sliding block beams parallel to one another, the upper rail being movably mounted thereon, at least one sliding block crossmember that connects the two sliding block beams to each with a ladder configuration and end stops for the at least one rolling body cage,
   wherein each end stop for a rolling body cage protrudes outwardly from one of the sliding block beams, the sliding block is rigidly connected to the lower rail, the rolling body cage is movable relative to the sliding block parallel to a longitudinal axis of the lower rail between two end positions defined by end stops of the sliding block and is coupled to the lower rail via the rolling bodies, and the upper rail is mounted movably on the sliding block along the longitudinal axis of the lower rail and is coupled to the rolling body cage.

6. The rail system as claimed in claim 5, wherein the rail system further comprises at least another rolling body cage having rolling bodies to provide two rolling body cages having rolling bodies, which are arranged on opposing sides of the sliding block, which in each case are movable relative to the sliding block parallel to the longitudinal axis of the lower rail between two end positions defined by end stops of the sliding block and which are coupled to the upper rail and via the rolling bodies to the lower rail.

7. The rail system as claimed in claim 6, wherein:
   each rolling body cage comprises a contact portion which contact portion faces the sliding block and which contact portion is angled relative to the longitudinal axis of the lower rail; and
   the contact portion extends between two end stops of the sliding block and, in two end positions of the rolling body cage, in each case comes into contact with one of the end stops.

8. The rail system as claimed in claim 7, wherein:
   the contact portion is arranged at one end of the sliding block and comprises a ramp stop end which has a surface on an upper face which drops toward an end of the sliding block; and
   the contact portion is produced from a resiliently deformable material so that, when sliding from the end of the sliding block over the ramp stop end, the contact portion is bent inwardly in a resilient manner and after passing the end stop adopts an original shape again.

9. The rail system as claimed in claim 5, wherein: the at least one rolling body cage comprises a contact portion which contact portion faces the sliding block and which contact portion is angled relative to the longitudinal axis of the lower rail; and the contact portion extends between two end stops of the sliding block and, in two end positions of the rolling body cage, in each case comes into contact with one of the end stops.

10. The rail system as claimed in claim 9, wherein:
the contact portion is arranged at one end of the sliding block and comprises a stop end which has a surface on an upper face which drops toward an end of the sliding block; and
the contact portion is produced from a resiliently deformable material so that, when sliding from the end of the sliding block over the ramp stop end, the contact portion is bent inwardly in a resilient manner and after passing the end stop adopts an original shape again.

11. The rail system as claimed in claim 5, wherein:
the lower rail comprises a lower rail bottom portion; and
for each rolling body cage a lower rail flank is angled relative to the lower rail bottom portion;
a lower rail end portion is angled inwardly and downwardly from the lower rail flank; and
the rolling body cage extends into a spatial region between the lower rail flank and the lower rail end portion, the rolling bodies of the rolling body cage bear against a region of the lower rail end portion which is angled inwardly.

* * * * *